United States Patent [19]

Saito

[11] Patent Number: 5,737,645

[45] Date of Patent: Apr. 7, 1998

[54] DISTANCE MEASURING APPARATUS AND METHOD OF MEASURING DISTANCE

[75] Inventor: Tatsuo Saito, Saitama, Japan

[73] Assignee: Fuji Photo Optical Co., Ltd., Saitama, Japan

[21] Appl. No.: 660,414

[22] Filed: Jun. 7, 1996

[30] Foreign Application Priority Data

Jun. 14, 1995 [JP] Japan .................................. 7-147893

[51] Int. Cl.$^6$ .................................................. G03B 13/36
[52] U.S. Cl. .............................. 396/98; 396/104; 396/106
[58] Field of Search ........................ 356/375; 396/97, 396/104, 106, 98, 125, 147

[56] References Cited

U.S. PATENT DOCUMENTS

| | | |
|---|---|---|
| 4,518,242 | 5/1985 | Toyama . |
| 4,592,638 | 6/1986 | Kaneda et al. . |
| 4,777,504 | 10/1988 | Akada et al. .................. 354/400 |
| 5,537,180 | 7/1996 | Matsumoto et al. ............. 354/402 |
| 5,589,910 | 12/1996 | Saito et al. .................... 396/106 |
| 5,652,926 | 7/1997 | Saito ........................... 396/97 |
| 5,655,160 | 8/1997 | Saito ........................... 396/106 |

Primary Examiner—Hoa Q. Pham
Attorney, Agent, or Firm—Leydig, Voit & Mayer, Ltd.

[57] ABSTRACT

A distance measuring apparatus uses both active and passive distance measuring methods. A preferable distance measuring method is selected based upon the luminance of the field and the distance to the object unless a focus lock switch is switched. When the focus lock switch is switched, then a distance measurement using the active distance measuring method is selected.

18 Claims, 6 Drawing Sheets

DISTANCE MEASURING APPARATUS AND METHOD OF MEASURING DISTANCE

BACKGROUND OF THE INVENTION

1. Field of the Invention

The present invention relates to a distance measuring apparatus and a method of measuring a distance for a camera which automatically measures a distance to an object.

2. Related Background Art

As such a distance measuring apparatus for a camera, a trigonometric distance measuring apparatus of an active method is well known which has a light source for distance measurement such as an LED and measures the distance to an object in combination with a light-receiving element.

As a distance measuring apparatus of another method, a trigonometric distance measuring apparatus of the passive method is known which has no light source for distance measurement, receives the natural light reflected by the object through two optical systems, and measures the distance to the object in accordance with a phase difference between two optical images obtained by the respective optical systems, and the like.

SUMMARY OF THE INVENTION

It is an object of the present invention to provide a distance measuring apparatus capable of performing more preferable distance measurement depending on a taking situation.

According to the present invention, a distance measuring apparatus comprises first distance measuring means of an active method for projecting distance measuring light toward an object to measure a distance to the object based on a position where reflected light is condensed, second distance measuring means of a passive method for receiving natural light reflected by the object by two optical systems to measure the distance to the object based on two optical images obtained by the optical systems, distance-value selecting means for selecting one of distance measurement results obtained by the first and second distance measuring means to output it, and a focus lock switch for holding a value of distance measurement to the object. The distance-value selecting means has detecting means for detecting depression of the focus lock switch, and first means for inhibiting distance measurement processing of the second distance measuring means when depression of the focus lock switch is detected by the detecting means.

The distance measuring apparatus according to another aspect of the present invention comprises second means for selecting a distance measurement result of the first distance measuring means when depression of the focus lock switch is detected by the detecting means, in place of the above-described first means.

The distance measuring apparatus of the present invention comprises two types of distance measuring means, i.e., the first distance measuring means of the active method and the second distance measuring means of the passive method, and selects one of the resultant distance measurement results by the distance-value selecting means. In a taking operation, detection of depression of the focus lock switch by the detecting means indicates that a photographer is to take a specific focused object. When the photographer performs a taking operation with a specific focal point set by himself/herself in this manner, active distance measurement in which an area subjected to distance measurement is narrow and limited to a specific range is desirably performed. In this case, distance measurement processing of the second distance measuring means is inhibited by the first means, or the distance measurement result of the first distance measuring means is selected by the second means.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In distance measurement of the above-described passive method, since the natural light reflected by the whole object is received, an area to be detected is wide. On the other hand, in distance measurement of the above-described active method, since distance measuring light is projected toward the object to receive the light reflected by the object, an area to be detected is limited to the spot range of the irradiated distance measuring light, resulting in a narrower range compared to the passive method.

In measuring the distance to a specific object, for example, when a photographer depresses a focus lock switch to take the specific object, the distance is measured preferably by the active method, rather than the passive method which performs distance measurement for a wide area.

The present invention has been made in consideration of the above problems. An embodiment of the present invention will be described below with reference to the accompanying drawings.

Figure 1:
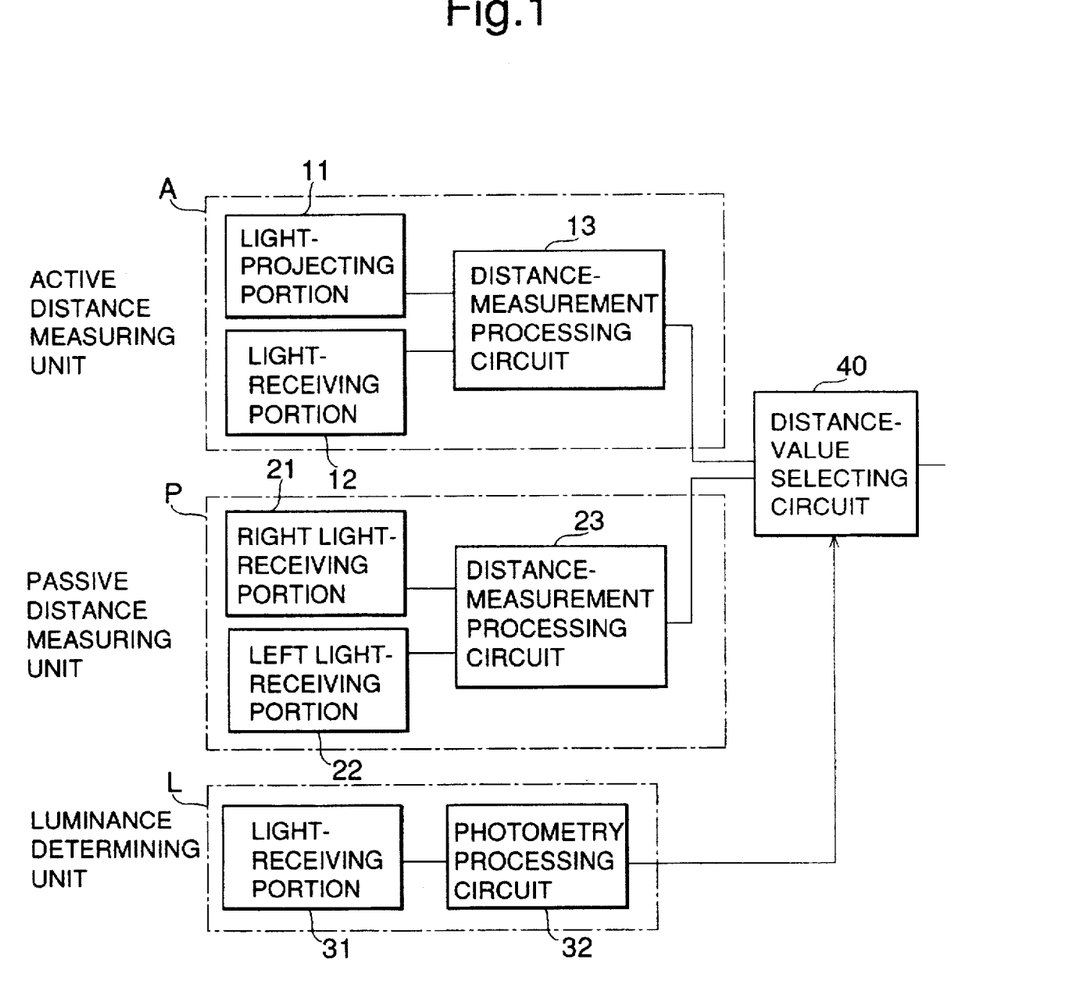
FIG. 1 is a block diagram to schematically show the arrangement of a distance measuring apparatus according to an embodiment of the present invention.
Figure 2:
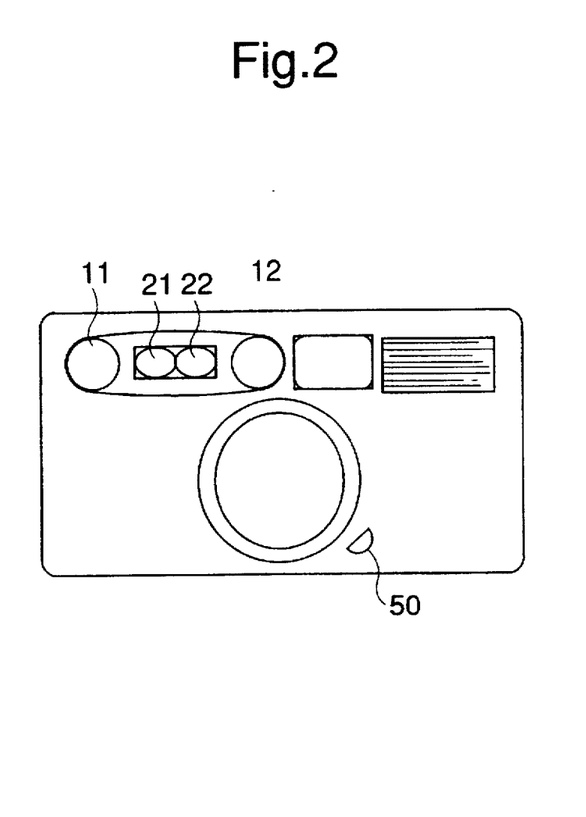
FIG. 2 is a front view to show a camera having the distance measuring apparatus according to the embodiment of the present invention.
Figure 3:
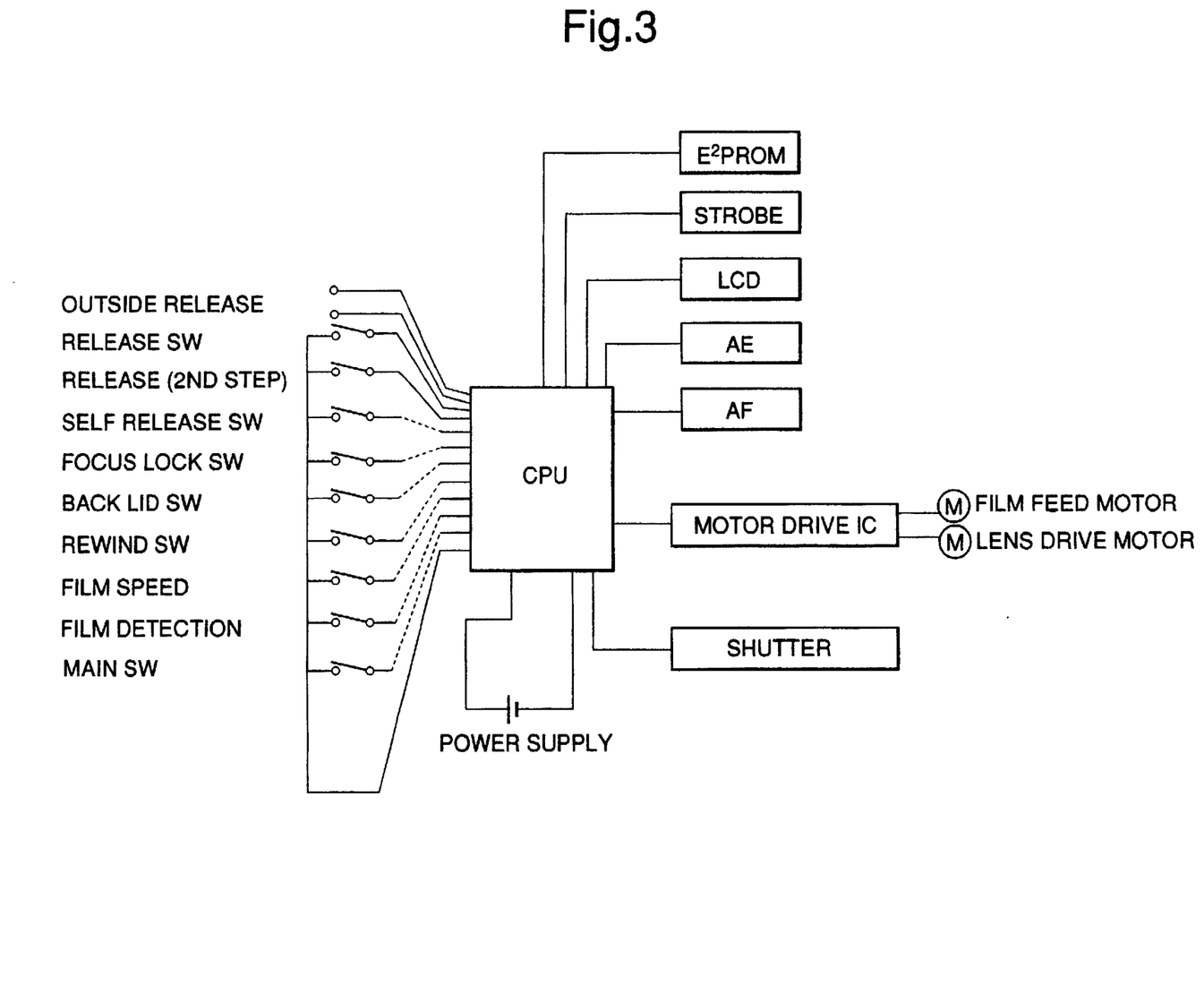
FIG. 3 is a block diagram to schematically show the internal arrangement of the camera shown in FIG. 2.

FIG. 1 shows the schematic arrangement of a distance measuring apparatus according to this embodiment, and FIG. 2 shows the outer appearance of a camera as one application of this distance measuring apparatus. FIG. 3 is a block diagram to schematically show the internal arrangement of this camera. This distance measuring apparatus comprises an active distance measuring unit A for executing trigonometric distance measurement of the active method, a passive distance measuring unit P for executing trigonometric distance measurement of the passive method, a luminance determining unit L for detecting the luminance of the external field, and a distance-value selecting circuit 40 for selecting distance measurement values obtained from the two distance measuring units.

The active distance measuring unit A comprises a light-projecting portion 11 constituted by an LED or the like for projecting distance measuring light toward an object, and a light-receiving portion 12 constituted by a photosensitive detector (PSD) or the like for receiving the reflected light (see FIG. 2). The active distance measuring unit A further comprises a distance-measurement processing circuit 13 for calculating the distance to the object based on the light-projecting/light-receiving result. Note that the distance measurement value obtained by the active distance measuring unit A is supplied to the distance-value selecting circuit 40.

The passive distance measuring unit P comprises two optical systems for receiving the reflected light of natural light from the object, i.e., right and left light-receiving portions 21 and 22 (see FIG. 2), a CCD (light position detecting device: not shown) for receiving two optical images obtained therethrough, a distance-measurement processing circuit 23 for calculating the distance to the object on the basis of a signal from the CCD, and the like. Note that the distance measurement value obtained in the passive distance measuring unit P is also supplied to the distance-value selecting circuit 40.

The luminance determining unit L utilizes an AE portion (automatic exposure portion) of all the constituents components of the camera shown in FIG. 3. The luminance determining unit L comprises a light-receiving element for controlling the exposure, e.g., a light-receiving portion 31 formed of CdS or the like, a photometry processing circuit 32 for calculating the luminance of the external field based on the light-receiving result, and the like.

The distance-value selecting circuit 40 selects one of the distance measurement values measured by the respective measuring units A and P based on the luminance of the external field obtained by the luminance determining unit L and the like, and outputs it.

The camera shown in FIG. 2 has a focus lock switch 50 at the lower portion on the front surface of the camera case. The distance measurement value to the target object is held by depressing the switch 50. When the photographer performs a taking operation in a focus-locked state, the photographer depresses the release switch while depressing the switch 50.

The focus lock switch has only a function of holding the distance measurement value to the object. Therefore, the focus lock switch need not be formed independently, and the camera may be constituted such that the focus is locked when, e.g., the release switch is depressed half.

The distance measurement value to the object may be held upon depression of the focus lock switch or upon release of the focus lock switch. In any case, the distance measurement value is held upon switching the focus lock switch.

FIG. 3 schematically shows the internal mechanism of the camera. Note that the distance-measurement processing circuits 13 and 23, the photometry processing circuit 32, and the distance-value selecting circuit 40, which are shown in FIG. 1, are arranged in a CPU shown in FIG. 3.

Figure 4:
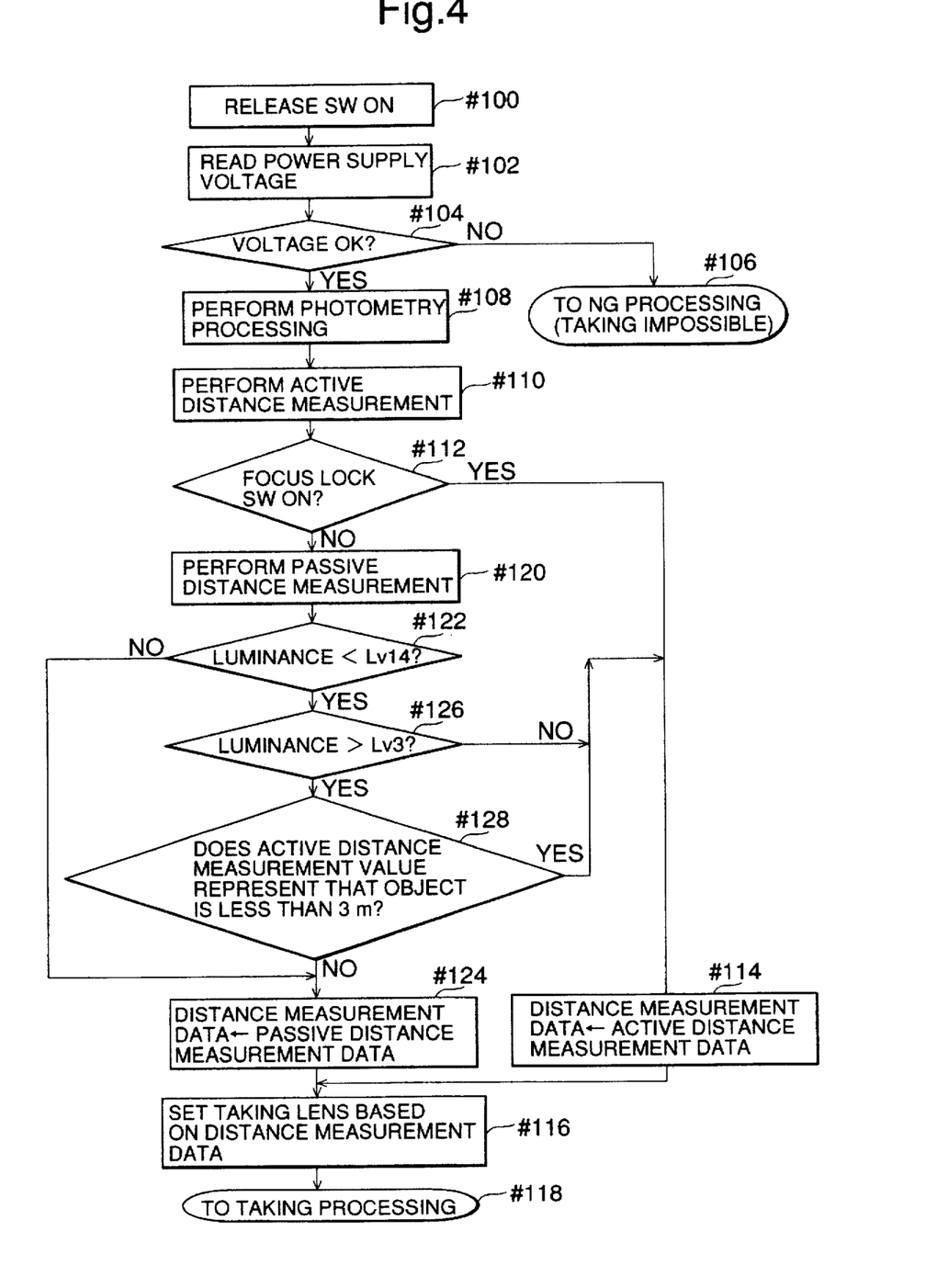
FIG. 4 is a flow chart to show the operation of the distance measuring apparatus according to the embodiment of the present invention.

The operation of this distance measuring apparatus will be described below With reference to FIG. 4.

First of all, when a release switch (see FIG. 3) is depressed with the camera facing to the object (#100), a power supply voltage is read in to check the voltage value (#102 and #104). If the read voltage value does not reach a threshold value ("NO" in #104), the flow shifts to predetermined NG processing (#106) to inform the user of that taking processing is impossible.

When the read voltage value reaches the threshold value ("YES" in #104), photometry processing of detecting the luminance of the external field is performed by the luminance determining unit L (#108), and distance measurement of the active method is performed in the active distance measuring unit A (#110).

Subsequently, it is checked whether the focus lock switch 50 in FIG. 3 is ON (#112). Note that, when the focus lock switch 50 is ON, the distance measurement value obtained by active distance measurement is held during a period when the switch 50 is kept depressed. If depression of the focus lock switch 50 is detected ("YES" in #112), distance measurement processing in the passive distance measuring unit P is inhibited under the control of the CPU. This is because depression of the focus lock switch indicates that the photographer performs a taking operation at a specific focal point set by himself/herself. In this case, the distance is measured preferably by the active method in which an area subjected to distance measurement is narrow and limited to a specific range, rather than the passive method in which a target area is wide. Therefore, if the ON state of the focus lock switch 50 is detected, the distance is measured not by the passive distance measuring unit P but by the active distance measuring unit A.

In this manner, if the ON state of the focus lock switch 50 is detected, only the distance measurement result of the active distance measuring unit A is supplied to the distance-value selecting unit 40, which outputs this distance measurement value (active distance measurement data) as distance measurement data (#114). The taking lens is set on the basis of this set distance measurement data (#116). The subsequent taking processing is executed on the basis of this distance measurement value (#118).

To the contrary, if the focus lock switch 50 is not depressed ("NO" in #112), the distance is measured by the passive method in the passive distance measuring unit P (#120). The distance measurement results in the respective distance measuring units A and P are supplied to the distance-value selecting circuit 40 through the distance-measurement processing circuits 13 and 23.

Next, the distance-value selecting circuit 40 checks whether the luminance of the external field obtained by the luminance determining unit L reaches high-luminance level of Lv14 or more (#122). When the luminance of the external field is high, the accuracy of distance measurement may decrease because the light-receiving portion 12 of the active method cannot properly receive the reflected light of distance measuring light; in the passive method, the reliability of the distance measurement value is high because the light quantity of the natural light reflected by the object increases. For this reason, if the luminance of the external field obtained by the luminance determining unit L is Lv14 or more ("NO" in #122), the distance-value selecting circuit 40 selects the distance measurement value of the passive distance measuring unit P (passive distance measurement data) and outputs it as distance measurement data (#124). The subsequent taking processing such as setting the taking lens based on the set distance measurement data (#116) is executed based on this distance measurement value output from the distance-value selecting circuit 40 (#118).

On the other hand, if the luminance of the external field is Lv14 or less ("YES" in #122), it is further checked whether the luminance of the external field is as low as Lv3 or less (#126). When the luminance of the external field is low, the reflected light quantity of the natural light is small, and the reliability is low in the passive method; in the active method, the reliability of the distance measurement value is high because the reflected light of the distance measuring light is properly detected at the light-receiving portion 12. For this reason, if the luminance of the external field obtained by the luminance determining unit L is Lv3 or less ("NO" in #126), the distance-value selecting circuit 40 selects the distance measurement value of the active distance measuring unit A (active distance measurement data) and outputs it as distance measurement data (#114). The subsequent taking processing is executed based on this distance measurement value output from the distance-value selecting circuit 40 (#116 and #118).

As described above, when the luminance of the external field is at high-luminance level of Lv14 or more or at low-luminance level of Lv3 or less, the distance-value selecting circuit 40 immediately selects one of the distance measurement values. When the luminance level is an intermediate luminance level of 3<Lv <14, the distance-value selecting circuit 40 selects the distance measurement value as follows.

The distance-value selecting circuit 40 checks whether the distance to the object is below 3 m (#128) based on the distance measurement result of the active distance measuring unit A. Since the distance measuring light is projected toward the object, and the reflected light is received in the active method, there is a limit on the light-projecting distance of the distance measuring light. If the distance to the object were too far, the reflected light would be insufficient, resulting in lowering the accuracy of distance measurement or disabling the distance measurement. Thus, if the distance measurement result by the active distance measuring unit A shows that the object is closer than 3 m ("YES" in #128), the distance-value selecting circuit 40 selects the distance measurement value of the active distance measuring unit A (active distance measurement data) having higher reliability, and outputs it as distance measurement data (#114). The subsequent taking processing is executed based on this distance measurement value output from the distance-value selecting circuit 40 (#116 and #118).

In contrast to this, if the distance measurement result of the active distance measuring unit A represents that the object is as far as 3 m or more ("NO" in #128), the distance-value selecting circuit 40 selects the distance measurement value of the passive distance measuring unit P (passive distance measurement data) and outputs it as distance measurement data (#124). The subsequent taking processing is executed on the basis of the distance measurement value output from the distance-value selecting circuit 40 (#116 and (#118).

In the distance measuring apparatus according to this embodiment, when the focus lock switch 50 is depressed, the distance measurement value of the active distance measuring unit A in which a target area is narrow and limited to a specific range can be selected; when the focus lock switch 50 is not depressed, of the distance measurement values obtained by the respective distance measuring units A and P, a distance measurement value having a higher reliability can be selected.

Figure 5:
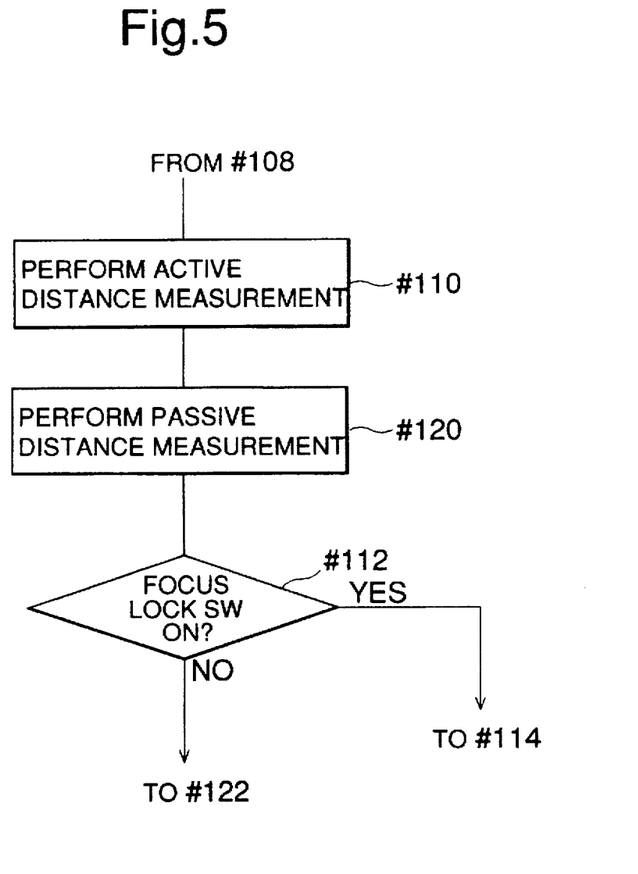
FIG. 5 is a flow chart showing another embodiment of the present invention.

The embodiment described above exemplifies the case in which the distance measurement processing of the passive distance measuring unit P is inhibited when the focus lock switch 50 is depressed. Alternatively, the distance measurement result of the active distance measuring unit A can be selected in the distance-value selecting circuit 40 when the focus lock switch 50 is depressed upon completion of distance measurement in both the active and passive distance measuring units A and P. Note that, as a flow chart in this case, only a flow changed from the flow chart in FIG. 4 is extracted and shown in FIG. 5.

Figure 6:
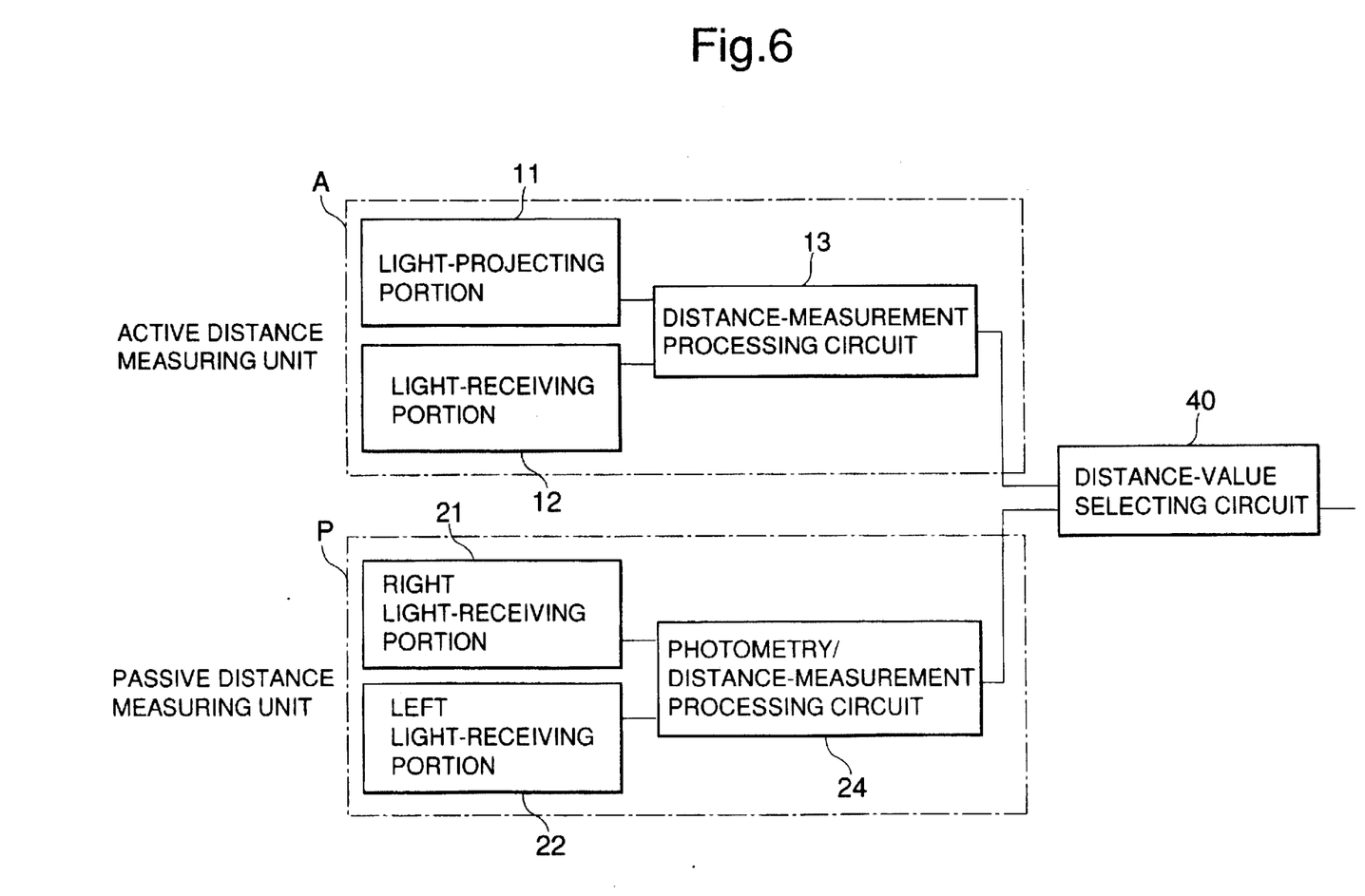
FIG. 6 is a block diagram to show still another embodiment of the present invention.

The above-described embodiment exemplifies the case of detecting the luminance of the external field by the luminance determining unit L. In addition to this, as shown in FIG. 6, the luminance of the external field can be obtained by the photometry/distance-measurement processing circuit 24 on the basis of the light-receiving results of the respective light-receiving portions 21 and 22 in the passive distance measuring unit P.

As has been described above, in the distance measuring apparatus of the present invention, when the detecting means detects depression of the focus lock switch, the first means inhibits the distance measurement processing of the second distance measuring means of the passive method, or the second means selects the distance measurement result of the first distance measuring means of the active method. For this reason, when the focus lock switch is depressed, the distance-value selecting means can select the distance measurement result of the first distance measuring means of the active method having a narrow target area and suitable for distance measurement for a specific, relatively small object. More preferable distance measurement can be performed depending on a taking situation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 147893/1995 (7-147893) filed on Jun. 14, 1995 is hereby incorporated by reference.

What is claimed is:

1. A distance measuring apparatus for measuring a distance to an object comprising:

first distance measuring means using an active method including projecting distance measuring light toward an object to measure the distance to the object based upon a position where light reflected by the object is condensed;

second distance measuring means using a passive method with two optical systems for detecting natural light reflected by the object to measure the distance to the object based on two optical images produced by said two optical systems;

a focus lock switch for designating whether a measured distance to the object is held; and distance selecting means, having a detecting portion for detecting switching of said focus lock switch, for inhibiting distance measurement by said second distance measuring means when switching of said focus lock switch is detected by said detecting portion.

2. An optical apparatus comprising:

first distance measuring means using an active method including projecting distance measuring light toward an object to measure the distance to the object based upon a position where light reflected by the object is condensed;

second distance measuring means .using a passive method with two optical systems for detecting natural light reflected by the object to measure the distance to the object based on two optical images produced by said two optical systems;

a focus lock switch for designating whether a measured distance to the object is held;

distance selecting means, having a detecting portion for detecting switching of said focus lock switch, for inhibiting distance measurement by said second distance measuring means when switching of said focus lock switch is detected by said detecting portion; and a lens system having a focus lockable by said focus lock switch.

3. A distance measuring apparatus for measuring a distance to an object comprising:

first distance measuring means using an active method including projecting distance measuring light toward an object to measure the distance to the object based upon a position where light reflected by the object is condensed;

second distance measuring means using a passive method with two optical systems for detecting natural light reflected by the object to measure the distance to the object based on two optical images produced by said two optical systems;

a focus lock switch for designating whether a measured distance to the object is held; and distance selecting means, having a detecting portion for detecting switching of said focus lock switch, for selecting distance measured by said first distance measuring means when switching of said focus lock switch is detected by said detecting portion.

4. An optical apparatus comprising:

first distance measuring means using an active method including projecting distance measuring light toward an object to measure the distance to the object based upon a position where light reflected by the object is condensed;

second distance measuring means using a passive method with two optical systems for detecting natural light reflected by the object to measure the distance to the object based on two optical images produced by said two optical systems;

a focus lock switch for designating whether a measured distance to the object is held;

distance selecting means, having a detecting portion for detecting switching of said focus lock switch, for selecting distance measured by said first distance measuring means when switching of said focus lock switch is detected by said detecting portion; and a lens system having a focus locked by said focus lock switch.

5. A method of measuring a distance to an object comprising:

a first step of projecting distance measuring light toward an object to measure the distance to the object using an active method based a position where light reflected by the object is condensed;

a second step of detecting whether a focus lock switch for designating whether a distance measured to the object is held, is switched; and a third step of inhibiting distance measurement using a passive method including measuring the distance to the object based on two optical images produced by two optical systems for detecting natural light reflected by the object when switching of said focus lock switch is detected in the second step.

6. The method according to claim 5, wherein a distance measured using the passive method is selected when no switching of said focus lock switch is detected in the second step, and luminance of an external field is not less than a predetermined level.

7. The method according to claim 6, wherein the predetermined level is Lv14.

8. The method according to claim 5, wherein a distance measured using the active method is selected when no switching of said focus lock switch is detected in the second step, and luminance of an external field is not more than a predetermined level.

9. The method according to claim 8, wherein the predetermined level is Lv3.

10. The method according to claim 5, wherein a distance measured using the passive method is selected when no switching of said focus lock switch is detected in the second step, luminance of an external field falls within a predetermined range, and the distance to the object obtained in the first step is not less a predetermined distance.

11. The method according to claim 10, wherein the predetermined distance is 3 m.

12. A method of measuring a distance to an object comprising:

a first step of measuring the distance to an object using both an active method based on a position where light reflected by the object is condensed, and a passive method based on two optical images produced by two optical systems for detecting natural light reflected by the object;

a second step of detecting whether a focus lock switch for designating whether a measured distance to the object is held, is switched; and a third step of selecting a measured distance obtained by the active method when switching of said focus switch is detected in the second step.

13. The method according to claim 12, wherein a measured distance obtained using the passive method is selected when no switching of focus lock switch is detected in the second step, and luminance of an external field is not less than a predetermined level.

14. The method according to claim 13, wherein the predetermined level is Lv14.

15. The method according to claim 12, wherein a measured distance obtained using the active method is selected when no switching of focus lock switch is detected in the second step, and luminance of an external field is not more than a predetermined level.

16. The method according to claim 15, wherein the predetermined level is Lv3.

17. The method according to claim 12, wherein a measured distance obtained using the passive method is selected when no switching of focus lock switch is detected in the second step, luminance of an external field falls within a predetermined range, and the distance to the object is not less than a predetermined distance.

18. The method according to claim 17, wherein the predetermined distance is 3 m.

* * * * *